Dec. 3, 1963     C. C. COWLEY     3,112,747
PROTECTOR
Filed Feb. 7, 1961
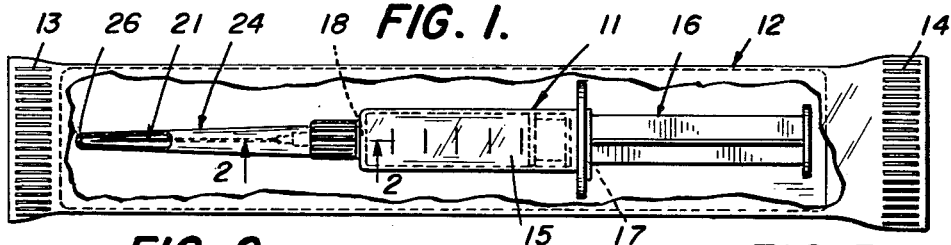
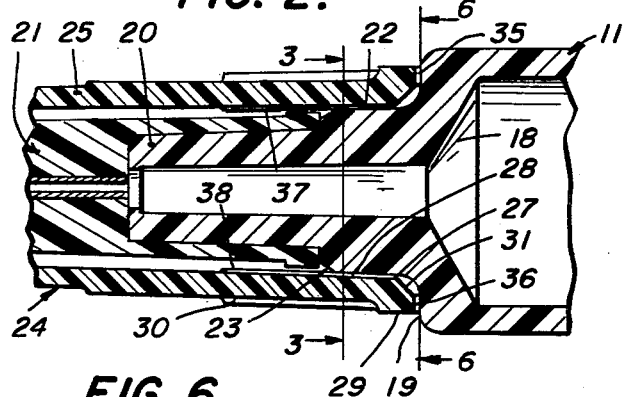
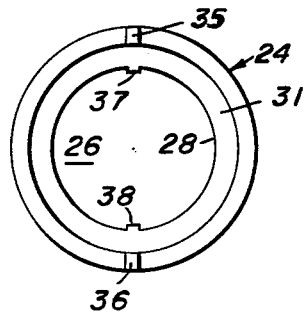
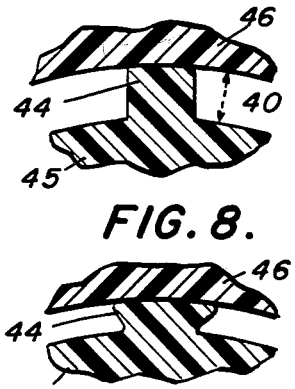
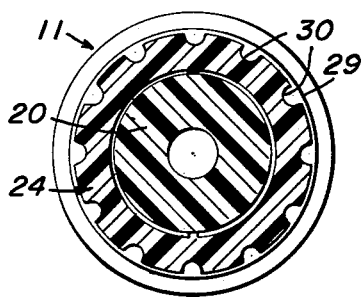
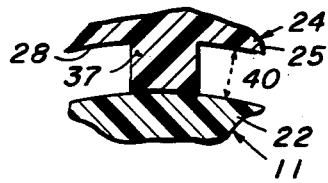
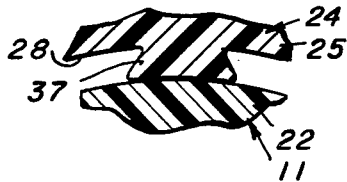
INVENTOR
CALVIN C. COWLEY
BY
Robert T. Merrick 3,112,747
PROTECTOR
Calvin C. Cowley, La Canada, Calif., assignor to Pharmaseal Laboratories, Glendale, Calif., a corporation of California
Filed Feb. 7, 1961, Ser. No. 87,644
6 Claims. (Cl. 128—218)

This invention relates to a protector for sterile instruments and particularly to a protector which allows entry of a sterilizing gas into the instrument, but prevents subsequent entry of microorganisms.

Disposable syringes, administration sets, needles and similar instruments are usually marketed in sterile, ready-to-use condition. The instruments and the packages both must be inexpensive so that the cost of replacing the entire unit after a single use is at least competitive with the cost of cleaning, repackaging and reusing the instrument.

Sterilization of the instruments is usually accomplished with a gas, such as ethylene oxide. This requires placing the packaged instruments in a pressure vessel and evacuating the vessel to a pressure of about ½ to 3 pounds per square inch. Sterilizing gas is then admitted to the vessel to a gauge pressure of approximately two atmospheres. Steam is then injected into the vessel to adjust the temperature to about 90° to 150° F. and the sterilization continued for 15 to 25 hours. At the end of the sterilization, the vessel is vented to the atmosphere, and the sterilized instruments are removed.

To keep the instruments clean and sterile, they are usually wrapped in an outer package of plastic film, such as polyethylene, glassine, cellophane, or a laminate of such materials. Such packages are inexpensive and are usually effective. However, it is very difficult to be sure that the package seals are always perfect and that there are no pinholes in the package film. Also, the package may be damaged by small tears which are particularly apt to occur near the package seals because of the changes of pressure occurring during sterilization. For these reasons, the instruments are usually provided with one or more protectors which close the end of the instrument so as to maintain the sterility of its interior. At least one of the protectors must obviously be provided with a means for allowing the sterilizing gas to reach the inside of the instrument. Thus, the protector is usually a tube containing a plug of cotton or other bacteria filtering material. Such protectors add to the cost of the package and are no longer effective after they have been wet. Also, the cotton plugs may become loose, fall out, or provide fibers which enter the equipment.

Closed protectors made of a material which is penetrated by the sterilizing gas, have been suggested. However, such protectors are apt to be blown off by rapid changes of pressure during the sterilizing cycle. If a closed protector is used on a syringe, the pressure change may cause the syringe plunger to move forward in the barrel. This leaves the barrel behind the plunger tip open to possible contamination if the outer package is not perfectly sealed. Also, the forward portion of the barrel usually has a considerably smaller diameter than the plunger, so that the plunger is apt to distort this portion of the barrel during storage.

It is therefore an object of this invention to provide an improved, inexpensive protector which allows entry of sterilizing gas, but prevents subsequent entry of microorganisms.

A further object of the invention is to provide an effective protector which is free of materials having loose fibers.

A still further object of the invention is to provide a protector having a passage for admitting sterilizing gases, which passage subsequently tends to close automatically.

Further features and advantages of the invention will be apparent from the examples shown in the drawings, in which:

FIGURE 1 is a plan view partially cut away showing the invention;

FIGURE 2 is an enlarged fragmentary sectional view on the line 2—2 of FIGURE 1;

FIGURE 3 is a sectional view on the line 3—3 of FIGURE 2;

FIGURE 4 is a further enlarged sectional view showing details of the protector rib when first assembled on the protector hub;

FIGURE 5 is a view similar to FIGURE 4 showing details of the protector rib after deformation of the rib;

FIGURE 6 is an elevational view of the protector only on the line 6—6 of FIGURE 2;

FIGURE 7 is a sectional view similar to FIGURE 4 showing a modified form of the invention; and FIGURE 8 is a sectional view similar to FIGURE 5 of the modified form of the invention.

As shown in the drawings, an instrument, such as a syringe 11, may be enclosed in a package 12 which is sealed at ends 13 and 14. Package 12 is preferably made of cellophane, polyethylene, or other thin film permeable to sterilizing gases, or a laminate of such materials. Syringe 11 has a barrel 15 having an open end 17 and a partially closed end 18. A reciprocating plunger 16 telescopes into barrel 15 from the open end 17.

At the partially closed end 18, syringe barrel 15 has a shoulder 19, a reduced diameter, tapered hub 22, and a further reduced diameter shank 20. Shank 20 is tapered and otherwise adapted to receive the hub of needle 21 which is mounted thereon. Syringe hub 22 has a tapered shoulder 23 and is adapted to receive the open end of protector 24.

Protector 24 has a tubular body 25 closed at one end by a transverse end wall 26 and open at the other end 27. At the open end 27, the walls of body 25 define a mouth 28 adapted to fit tightly over syringe hub 22 and having a tapered lead-in section 31. A circumferential, annular flange 29 reinforces the protector wall adjacent open end 27. Circumferentially spaced grooves 30 run longitudinally from flange 29 along the outer surface of body 25, to aid in gripping protector 24.

On the inner surface of protector body 25, a rib 37 extends longitudinally in from mouth 28 for at least the entire length of hub 22. If desired, a second longitudinal rib 38 may be provided on the opposite side of body 25. The radial surface at the open end 27 of the protector is provided with two pads 35, 36 which rest against shoulder 19 so as to provide a space between the radial surface and said shoulder.

In general, syringe hub 22 will be made of a rigid material such as polystyrene. In this case, protector 24 is made of a soft thermoplastic material having a tendency to cold flow or deform under load. Polyethylene is a particularly suitable material and polypropylene or polyvinyl chloride can also be used. Rigid materials such as polystyrene are usually not suitable.

The optimum dimensions of ribs 37, 38 obviously depend on many factors. For example, the height of the rib depends on the tightness of fit between the protector and the hub, and this is governed by the relative diameters of the protector and hub. The material of which the rib is made, its cold flow properties, and the sterilization cycle to be used, also help to determine the optimum rib dimensions.

If the protector 24 is made of low density polyethylene, the mouth 28 of the protector should have a diameter from 0.003 to 0.010 inch less than the maximum diameter of hub 22. In this case, ribs 37, 38 may be from 0.002 to 0.010 inch high, and preferably are from 0.003 to 0.007 inch high. Thus, when first assembled, the annular space 40 between protector 24 and hub 22 is from 0.002 to 0.010 inch thick. If the space 40 is too small, the pressure inside protector 24 does not change quickly enough when the pressure of the surrounding atmosphere changes. This is apt to cause plunger 16 to be sucked into the front portion of barrel 15, or to be blown out of the barrel during the sterilization. If the space 40 is too large, microorganisms may enter the protector after sterilization. Also, too large a rib 37 has a tendency to tear off when it is assembled onto hub 22. The width of rib 37 is less critical than the height, but is preferably from 0.005 to 0.20 inch.

As best shown in FIGURE 2, pads 35, 36 prevent the open end 27 of the protector from closing completely against the radial surface of syringe shoulder 19. Likewise, ribs 37, 38 provide a longitudinal space 40 between protector 24 and hub 22. During sterilization, sterilizing gas passes through outer package 12, through the spaces adjacent pads 35, 36, across the lead-in surface 31, through the space 40 into protector 24, and through the needle 21 into the syringe barrel 15. During sterilization, rib 37 tends to flatten as shown in FIGURE 5, decreasing the annular space 40 between protector mouth 28 and syringe hub 22. This flattening of rib 37 usually continues after sterilization.

Usually, outer package 12 prevents contamination of the syringe. However, the package may be damaged during shipping or storage and in this case, protector 24 maintains sterility of needle 21 and syringe 11.

Protector 24 is surprisingly effective in maintaining sterility, even though an open space or passage 40 exists between the protector 24 and hub 22. Syringes with protectors 24, but without the outer packages 12, have been exposed to a fine spray of liquid containing *B. subtilis*. Even after exposure to this highly contaminated atmosphere for a period of one hour, the needle surfaces inside protector 24 were sterile. The reason for this is not completely understood, but it is believed that the small space forces intimate contact between the bacteria and the plastic surfaces, and that under these circumstances, the plastic surfaces exhibit a bacteriostatic effect. It is also within the scope of my invention to incorporate a bactericidal or bacteriostatic agent in one or both of the plastics forming protector 24 and hub 22.

FIGURES 7 and 8 show a modification of the invention in which the rib 44 is integral with hub 45. In this case, hub 45 is made of a soft plastic material, such as polyethylene. The protector 46 may be made of either rigid or soft plastic material.

For the purpose of illustration, the protector of my invention has been described in conjunction with a disposable plastic syringe. My protector also may be advantageously used on administration sets or individually packaged needles. Other changes and modifications may also be made by those skilled in the art without departing from the scope of my invention.

I claim:

1. A sterilizable, hypodermic, injection device comprising: a rigid tubular member having an axial bore, a tapered hub and a tapered, reduced-diameter shank adapted to be telescoped into the hub of a hypodermic needle; a tubular protector having an imperforate closed end and an open end, said open end telescoping over the tapered hub of the rigid member and fitting tightly around said hub; and a longitudinal rib between the tubular protector and the hub, said rib being formed of a soft plastic material which gradually deforms under load at temperatures below 150° F., having a thickness of from 0.003 to 0.007 inch and a width of from 0.005 to 0.20 inch.

2. A sterilizable, hypodermic syringe and protector unit comprising: a hollow, cylindrical, plastic barrel having an open end and a partially closed end; a plunger having a first portion slideably positioned within said barrel and a second portion extending from the open end of the barrel; a rigid tubular member extending from the partially closed end of the barrel and having an axial bore communicating with the interior of the barrel; a tapered hub on said tubular member, said hub having a smaller diameter than the barrel to provide a radial shoulder surface therebetween; a tapered shank on said tubular member adjacent said hub, said shank having a diameter less than that of the hub and being adapted to receive the hub of a hypodermic needle; a tubular protector having an imperforate closed end and an open end, said open end being telescoped over the tapered hub of the rigid member and fitting tightly around said hub; and a longitudinal rib between the tubular protector and the hub, said rib being formed of a soft plastic material which gradually and permanently deforms under load at temperatures below 150° F., having a thickness of from 0.003 to 0.007 inch and a width of from 0.005 to 0.20 inch.

3. A sterilizable, hypodermic syringe and protector unit comprising: a hollow, cylindrical, plastic barrel having an open end and a partially closed end; a slideable plunger telescoped into said barrel and having a portion extending longitudinally from the open end of the barrel; a rigid tubular member integrally formed with and axially extending from the partially closed end of the barrel, said member having a tapered hub section, a tapered shank section and an axial bore, said hub section having a diameter smaller than the barrel to provide a radial barrel shoulder therebetween and said shank section having a diameter less than that of the hub; a hypodermic needle having a hub, said hub being telescoped tightly over said shank section; a tubular protector having a closed end, an open end, and a radial surface at the extremity of said open end, said open end being telescoped over the tapered hub of the rigid member and fitting tightly around said hub; a longitudinal rib between the tubular protector and the hub, said rib being formed of a soft plastic material which gradually and permanently deforms under load at temperatures below 150° F., having a thickness of from 0.003 to 0.007 inch and a width of from 0.005 to 0.20 inch; and at least one protruding pad between the radial protector surface and the radial barrel shoulder to provide a space therebetween.

4. A sterilized, hypodermic syringe and protector unit comprising: a hollow, cylindrical, plastic barrel having an open end and a partially closed end; a slideable plunger telescoped into said barrel and having a portion extending longitudinally from the open end of the barrel; a rigid tubular member integrally formed with and axially extending from the partially closed end of the barrel, said member having a tapered hub section, a tapered shank section and an axial bore, said hub section having a diameter smaller than the barrel to provide a radial barrel shoulder therebetween and said shank section having a diameter less than that of the hub; a hypodermic needle having a hub, said hub being telescoped tightly over said shank section; a tubular protector having an imperforate closed end and an open end, said open end being telescoped over the tapered hub of the rigid member and fitting tightly around said hub; and a longitudinal rib between the tubular protector and the hub, said rib being formed of a soft plastic material which gradually deforms under load at temperatures below 150° F., said rib having a thickness of less than 0.003 inch, a width of from 0.005 to 0.20 inch adjacent one extremity and a greater width at the other extremity as a result of such gradual, permanent deformation.

5. In a sterilizable hypodermic syringe and protector unit including a hollow, cylindrical, plastic syringe body, one end of which is open and the other partially closed; a slideable plunger telescoped partially into the barrel and having a handle portion extending out through the open end of the barrel; a tubular member extending from the partially closed end of the barrel and having a tapered shank with a hypodermic needle mounted thereon, a tapered hub of intermediate diameter between the barrel and the shank, and an axial bore; a tubular protector having an open end and an opposite end, said open end being telescoped over the tapered hub of the tubular syringe member and fitting tightly around said hub, the improvement comprising an imperforate transverse end wall closing said opposite end of the protector and a longitudinal rib between the tubular protector and the tapered hub, said rib being formed of a soft plastic material which gradually deforms under load at temperatures below 150° F., and having a thickness of from 0.003 to 0.007 inch and a width of from 0.005 to 0.20 inch, whereby a shielded channel is provided along at least one side of the rib to permit the entry of sterilizing gas into the unit, after which the rib gradually deforms to reduce the size of said passage, and thereby prevent the entry of contaminating organisms.

6. A sterilizable hypodermic syringe and protector unit as set forth in claim 5 wherein the rib is formed of low density polyethylene.

References Cited in the file of this patent

UNITED STATES PATENTS

| | | |
|---|---|---|
| 2,550,394 | Young | Apr. 24, 1951 |
| 2,732,092 | Lawrence | Jan. 24, 1956 |
| 2,812,231 | Zar | Nov. 5, 1957 |
| 2,816,682 | Brucker | Dec. 17, 1957 |
| 2,834,496 | Boston | May 13, 1958 |
| 2,860,635 | Wilburn | Nov. 18, 1958 |
| 2,883,262 | Borin | Apr. 21, 1959 |
| 2,940,445 | Adams | June 14, 1960 |
| 2,972,991 | Burke | Feb. 28, 1961 |